J. H. REECE.
AIR VALVE.
APPLICATION FILED FEB. 15, 1912.
1,052,173.
Patented Feb. 4, 1913.
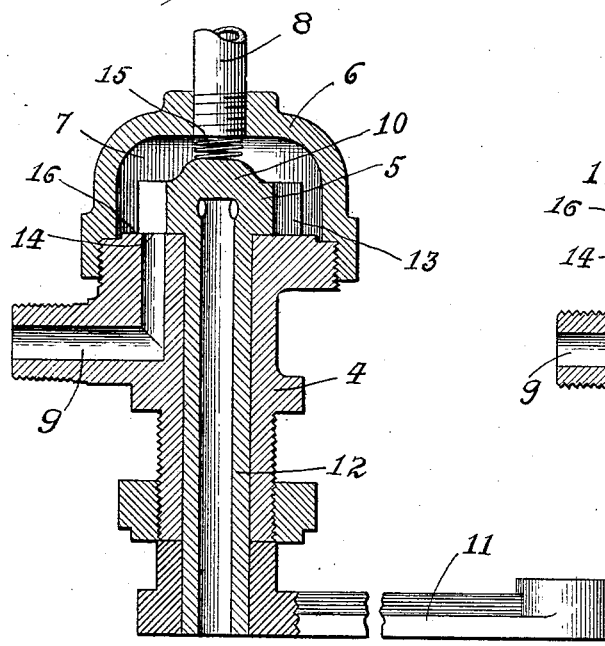
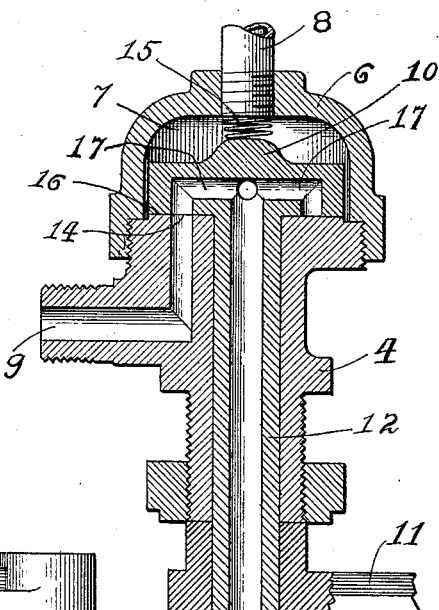
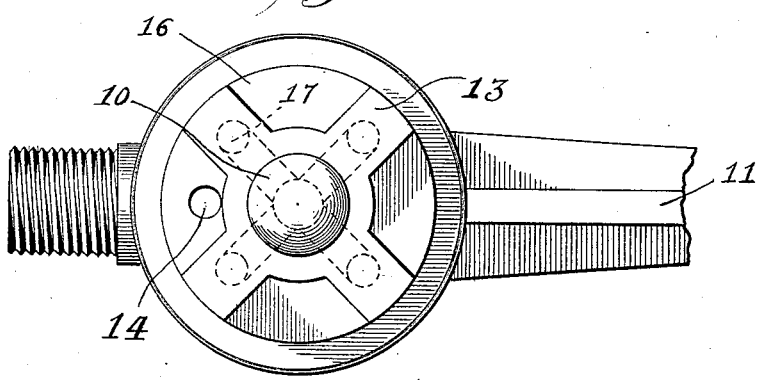
Inventor
Juan H. Reece

UNITED STATES PATENT OFFICE.

JUAN H. REECE, OF JOLIET, ILLINOIS, ASSIGNOR TO HUMPHREY & SONS, OF JOLIET, ILLINOIS, A COPARTNERSHIP.

AIR-VALVE.

1,052,173. Specification of Letters Patent. Patented Feb. 4, 1913.

Application filed February 15, 1912. Serial No. 677,760.

*To all whom it may concern:*

Be it known that I, JUAN H. REECE, a citizen of the United States, residing in the city of Joliet, in the county of Will and State of Illinois, have invented certain new and useful Improvements in Air-Valves, of which the following is a specification.

This invention relates to valves adapted for controlling the passage of an elastic medium under pressure to any desired mechanism, and for exhausting the same therefrom, and is particularly adapted for use in connection with the control of compressed air.

The principal objects of the present invention are to construct a valve of a simple, efficient, and inexpensive type which will provide a tight seal to prevent leakage of air; a valve comprising but few parts, all of which are readily accessible; to provide a valve in which the engaging surfaces will tend to wear evenly and in such a manner that a tight seal will always be preserved in the valve to prevent leakage of air; and to provide a valve which will accomplish the above mentioned purposes without the use of packing.

The invention further consists in the features of construction and combination of parts hereinafter described and claimed.

This valve is especially designed to be used where it is desired to control the passage of air or other similar elastic mediums under pressure for the actuation of mechanism. It is also designed for use where it is desired that such controlling means should govern the escape or exhaust of air therethrough, thereby permitting the mechanism which is actuated to return to its original position.

In the drawing, Figure 1 is a longitudinal section through the valve as it would appear in open position for the passage of air therethrough; Fig. 2 is a view similar to Fig. 1, showing the parts in position to exhaust the air; and Fig. 3 is a plan view of the interior of the valve, showing the same in open position.

The valve of the present invention consists essentially of three principal parts; viz., a body portion 4, a valve member 5, and a cap member 6. Into a chamber 7 formed within the cap member air under pressure is admitted through a conduit 8, and is normally prevented from escaping through a duct 9 formed in the body of the valve by means of a valve head 10 which is controlled by means of a lever 11 acting through a hollow stem 12. Lugs 13 formed upon the valve member 10 are adapted when the valve is in closed position to cover an entrance 14 to the duct 9, and in this manner prevent the passage of air therethrough. In the form shown, the lugs are oppositely disposed so as to provide a cross-shaped arrangement. Tension mechanism 15 located within the chamber 7 tends to maintain the valve head 10 in constant and even engagement with a flat face 16 upon the valve body, and thus prevent leakage or escape of air through the duct 9. In order that air may be enabled to pass from the conduit 8 to the said duct, it is obvious that proper manipulation of the lever 11 will bring the valve head 10 into position to uncover the entrance 14 to the duct 9, thereby allowing air to flow readily therethrough.

It is desirable in a valve of this type that means be provided for exhausting the air which has been permitted to pass through the valve for the actuation of any desired mechanism. For this purpose, therefore, ports 17 are provided in the valve head which lead from the hollow opening in the interior of the stem 12 to a point in each of the lugs 13 where they may register with the opening 14 in the duct 9. Proper rotation of the valve head, therefore, will successively bring each of the ports 17 into register with the opening 14 so that the air which is permitted to escape through into the duct 9 may be exhausted back and out again through the opening in the hollow stem 12. It will be noted that the arrangement of the duct 9 with respect to the ports 17 is such that the position of the valve head will either permit passage of air through the valve, or allow the air which has so passed to be exhausted again; the movement of air in either direction cannot take place until its passage in the other is checked by movement of the valve head.

In the present invention, it is to be noted that the acting face of the valve head is seated squarely upon the flat face 16 of the valve body, and that the air which is admitted through the conduit 8 exerts upon said head a constant pressure to maintain the same in tight engagement with the valve body. This results in the decided advantage that it is the air itself which tends to maintain the parts in close engagement for the forming of a tight seal against leakage, thereby obviating entirely the use of packing for such a purpose. In case the valve head should tend to tilt or cant, or become unevenly seated upon the face of the valve body, the spring 15 is designed to exert a relatively light tension which will tend to keep the same in engagement therewith, and will be assisted in this matter, as just previously explained, by means of the air pressure itself acting upon the valve head. It is obvious that the spring 15 would not be required if the valve were to remain constantly in a vertical plane, but it performs its functions on such occasions as the valve is shifted around by the movements of the mechanism to which it is attached, to prevent canting or tilting of the valve member which movement would obviously permit of leakage.

The actuation of the valve of the present invention may be through a lever 11, such as is shown in the figures of the drawing, and may be imparted through a rocking or tilting movement thereof. It is obvious, however, that where it is desired to admit air intermittently for the actuation of mechanism, a wheel may be substituted to produce such a movement of the head, and the valve will operate in exactly the same way. When a rocking or tilting movement is imparted to the lever in order to control the passage and exhaust of air through the valve, it is obvious that but one port 17 need be formed in the valve member since the movement of said head would be but a small part of a complete revolution, and the lug 13, in which said port is formed, would be returned periodically to a position for permitting the exhaust of air therethrough. Where, however, the movement imparted to the valve head is that of an intermittent rotation, each of said lugs should preferably be formed with a port 17, as is best indicated in Fig. 3, in order that, with each successive movement of the valve head, air may be allowed to escape through into the duct 9 or to be exhausted back and out through the stem 12.

I claim:

In a valve of the class described, the combination of a body portion provided with a chamber, means for conducting pressure to said chamber, a valve mounted in said body portion, comprising a head lying within said chamber, a duct leading from said chamber, said head being cut away at intervals to form members adapted to periodically close communication between said chamber and duct on continued movement of the valve, an exhaust passage extending through said valve comprising passages through said members adapted to periodically be brought into communication with said duct on said continued movement, substantially as described.

JUAN H. REECE.

Witnesses:
Lewis W. Connell,
W. J. Robinson.

---

Copies of this patent may be obtained for five cents each, by addressing the "Commissioner of Patents, Washington, D. C."